(12) United States Patent
Elser et al.

(10) Patent No.: US 11,557,886 B2
(45) Date of Patent: Jan. 17, 2023

(54) CABLE CONDUIT WITH INTEGRATED SENSORS

(71) Applicant: ABB Schweiz AG, Baden (CH)

(72) Inventors: Pierre Elser, Zürich (CH); Peter Schuster, Bachenbülach (CH); Yannick Maret, Dättwil (CH); Rudi Velthuis, Lauchringen (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/275,012

(22) PCT Filed: Aug. 29, 2019

(86) PCT No.: PCT/EP2019/073070
§ 371 (c)(1),
(2) Date: Mar. 10, 2021

(87) PCT Pub. No.: WO2020/052983
PCT Pub. Date: Mar. 19, 2020

(65) Prior Publication Data
US 2022/0069555 A1    Mar. 3, 2022

(30) Foreign Application Priority Data

Sep. 11, 2018  (EP) .................................. 18193766

(51) Int. Cl.
*H02G 3/04*   (2006.01)
*G01D 9/00*   (2006.01)

(52) U.S. Cl.
CPC ............. *H02G 3/0406* (2013.01); *G01D 9/00* (2013.01)

(58) Field of Classification Search
CPC ........ H02G 1/06; H02G 11/02; H02G 15/113; H02G 3/0406; E21B 47/06; H04W 4/38; F16L 7/02; H01B 7/046; H01B 7/0009; H01B 7/0275
See application file for complete search history.

(56) References Cited

U.S. PATENT DOCUMENTS

| 6,581,455 | B1 | 6/2003 | Berger et al. |
| 7,121,158 | B2 | 10/2006 | Scott et al. |
| 8,586,865 | B2 * | 11/2013 | Power ................ A61B 17/3423 174/68.3 |

(Continued)

FOREIGN PATENT DOCUMENTS

| CN | 105490221 A | 4/2016 |
| CN | 205407166 U | 7/2016 |

(Continued)

OTHER PUBLICATIONS

European Patent Office, International Search Report in International Patent Application No. PCT/EP2019/073070, 3 pp., (dated Oct. 7, 2019).

(Continued)

*Primary Examiner* — Krystal Robinson
(74) *Attorney, Agent, or Firm* — Leydig, Voit & Mayer, Ltd.

(57) ABSTRACT

A cable conduit comprises at least one cable, a tube, which accommodates the cable in an interior space and a sensor for sensing an environmental condition in the interior space of the tube.

12 Claims, 6 Drawing Sheets

(56) References Cited

U.S. PATENT DOCUMENTS

| | | | | |
|---|---|---|---|---|
| 2002/0029883 A1* | 3/2002 | Vinegar | ................ | E21B 43/123 |
| | | | | 166/250.03 |
| 2002/0092649 A1* | 7/2002 | Bixenman | ............. | E21B 43/103 |
| | | | | 166/278 |
| 2003/0094282 A1* | 5/2003 | Goode | .................... | E21B 49/10 |
| | | | | 166/255.2 |
| 2010/0050905 A1* | 3/2010 | Lewis | .................... | E21B 41/00 |
| | | | | 106/638 |
| 2010/0051266 A1* | 3/2010 | Roddy | ................... | E21B 47/01 |
| | | | | 166/250.01 |
| 2010/0051275 A1* | 3/2010 | Lewis | ................ | C04B 40/0641 |
| | | | | 166/286 |

FOREIGN PATENT DOCUMENTS

| | | | |
|---|---|---|---|
| DE | 10356340 | A1 | 6/2004 |
| DE | 102006036720 | A1 | 2/2008 |
| EP | 1884811 | A1 | 2/2008 |
| GB | 2466862 | A | 7/2010 |
| GB | 2467177 | A | 7/2010 |
| GB | 2475910 | A | 6/2011 |
| KR | 10-2008-0038721 | A | 5/2008 |
| KR | 10-0916146 | B1 | 9/2009 |
| WO | 2007/051230 | A1 | 5/2007 |

OTHER PUBLICATIONS

European Patent Office, Written Opinion in International Patent Application No. PCT/EP2019/073070, 5 pp., (dated Oct. 7, 2019).

\* cited by examiner ical Patent Application No. PCT/EP2019/
073070, filed on Aug. 29, 2019, and claims the benefit of
European Patent Application No. 18193766.5, filed Sep. 11,
2018, the disclosures of which are incorporated herein by
reference in their entireties for all purposes.

CABLE CONDUIT WITH INTEGRATED SENSORS

CROSS-REFERENCE TO RELATED APPLICATIONS

This patent application is a U.S. national phase application of International Patent Application No. PCT/EP2019/073070, filed on Aug. 29, 2019, and claims the benefit of European Patent Application No. 18193766.5, filed Sep. 11, 2018, the disclosures of which are incorporated herein by reference in their entireties for all purposes.

FIELD OF THE INVENTION

The invention relates to a cable conduit.

BACKGROUND OF THE INVENTION

Cables for transmitting electrical power and/or data are often protected by a surrounding tube that may be called cable conduit. The function of such a cable conduit may comprises the mechanical protection of the cable from its surrounding, the packing together of several cables, easy cleanability, electrical shielding, grounding and/or labelling. A cable conduit may be hermetically closed, partially open or open on all ends.

For several reasons it may be of interest to know an inside condition of such a cable conduit, for example for early failure detection, maintenance intervals and/or active control of the inside atmosphere.

The inside condition of a cable conduit may be of importance for several applications, such as a contamination risk and/or an early failure detection. Usually, the inside condition of a cable conduit can only be estimated and the only way to prevent any failures are simple counter-measures, such as water release tap or regular and expensive maintenances, such as replacing whole systems.

GB 2 475 910 A describes a method and apparatus for in-site wellbore measurement and control with inductive connectivity, where a wireless instrument unit including a sensor and actuator package locates outside of a tubing section is in wireless communication with, and may be inductively powered by, an electromagnetic transceiver inside a non-magnetic portion of the wellbore conduit and mounted on an electric-line logging cable attached to a downhole interface unit for controlling communication to the apparatus.

WO 2007/051230 A1 describes a sensing cuff for use with a breathing apparatus that delivers a supply of pressurized gas along a gas delivery path to a patient for treatment includes a conduit portion adapted to be communicated with the gas delivery path and a sensing arrangement provided to the conduit portion. The sensing arrangement is configured to sense or sample one or more characteristics of the gas passing through the conduit portion in use and wirelessly transmit characteristic data of the gas to a remote device.

DE 10 2006 036720 A1 describes a method for producing a pipe or container which has at least one information carrier suitable for detecting and storing information, and a pipe or a container which is produced in particular according to this method.

GB 2 466 862 A describes a method and apparatus for in-situ wellbore measurements, where a wireless sensor unit is outside a non-magnetic casing and a sensor energiser unit is inside the casing. The energiser unit supplies power to, and communicates with, the sensor unit wirelessly through the casing.

DESCRIPTION OF THE INVENTION

It is an objective of the invention to provide a more safe, easier to maintain and better protected cable conduit.

This objective is achieved by the subject-matter of the independent claims. Further exemplary embodiments are evident from the dependent claims and the following description.

An aspect of the invention relates to a cable conduit. A cable conduit may be any hollow device, which is used for guiding and/or protecting one or more cables inside.

According to an embodiment of the invention, the cable conduit comprises at least one cable, which may be a power line, a data transmission line and/or a fibre optics line; a tube, which accommodates the cable in an interior space; and a sensor for sensing an environmental condition in the interior space of the tube, wherein the sensor comprises a wireless sender for sending measurement data to an outside of the tube, wherein the sensor is positioned in a cavity in fluid exchange with the interior space of the tube.

The cable may be used for transmitting electrical power and/or data. The cable may comprise one or more wires, which may be enclosed in a plastics cover.

According to an embodiment of the invention, the cable is a power line. The cable may be used for transmitting power, for example from a power source, such as a battery or a generator, to a load, such as a motor, a heater, etc. The voltage in the cable may be much higher as a supply voltage of the sensor and/or the actuator. It also may be that the cable is a transmission line for transmitting data communication signals. As a further alternative, the cable may be a fibre optics line, which also may be used for transmitting data communication signals. The cable conduit may accommodate a plurality of cables in its interior space, which may be of different type, for examples of such types as described above.

The tube may be made of plastics and optionally other materials. These materials may be adapted for shielding electromagnetic fields, for electrical and/or thermal isolation, etc. The tube may be an extruded cylinder and/or may be made of several parts, which are attached and/or plugged to each other. The interior space in the tube may be longitudinal and may be used for accommodating the one or more cables.

In the interior space, specific environmental conditions, such as a temperature and/or a humidity may be present, which may be measured by the sensor. The sensor may be at least one of a temperature sensor and a humidity sensor. In general, the sensor may measure various physical properties and/or environmental conditions, such as temperatures, humidity, pressure, smoke, conductivity and/or vibrations.

It has to be noted that the cable conduit may comprise more than one sensor for sensing an environmental condition in the interior space at different locations of the tube. The one or more sensors may be integrated inside and/or on the outside of the tube. Monitoring physical properties at different locations along the cable conduit may provide the possibility to detect failures, like water ingress, condensation, leakages and/or overheating inside the tube.

For example, a control device or control system may collect the measurement values and/or measurement data from the one or more sensors and may evaluate them to determine the environmental condition inside the tube. A safer operation of the cable conduit may be provided through early failure detection.

However, it may be possible that the data generated by the sensor is stored in the sensor and then is read with a reading device.

According to an embodiment of the invention, the cable conduit comprises an actuator for changing the environmental condition in the interior space. For example, the actuator may be at least one of a ventilator; a heater; a cooler; a flap, etc.

It has to be noted that the cable conduit may comprise more than one actuator. A plurality of actuators may be positioned at different locations of the cable conduit.

With the one or more actuators, the atmosphere inside the tube may be actively controlled. The control device or control system mentioned above may determine the environmental condition in the interior space and may control the actuator to change the environmental condition such as desired. In such a way, active control may be taken to obviate failures as mentioned above. This may increase a lifetime of the cable conduit and/or may reduce the effort of maintenance.

According to an embodiment of the invention, the cable conduit further comprises a control device for receiving measurement values and/or measurement data from the sensor and for sending control commands to the actuator. The control device may be part of the sensor and/or the actuator. The sensor and the actuator may be directly connected for communication. Based on the measurement of the one or more sensors, the one or more actuators may be controlled to maintain a desired environmental condition in the interior space of the tube.

For example, a long-range gateway device may receive the measurement data from the one or more sensors and may feed this information to a local network, to which the control device is connected, or to a cloud server, which may act as control device. Wireless protocols such as BLE, LoRa, GSM, IEEE 802.15.4g may be used. In the same way, the long-range gateway device may receive control commands from the control device and may supply them to the one or more actuators.

According to an embodiment of the invention, the sensor comprises a wireless sender for sending measurement values and/or the actuator comprises a wireless receiver for receiving control commands. The one or more sensors may communicate with the control device via a wireless or wire bound communication channel, for example via Bluetooth. The one or more actuators may communicate with the control device via a wireless or wire bound communication channel, for example via Bluetooth.

According to an embodiment of the invention, the sensor comprises a power line transmission device for sending measurement values via the cable. Also, the actuator comprises a power line transmission device for receiving control commands via the cable. It also may be that the data transmission of the sensor and/or the actuator is performed via a power supply line of the sensor and/or the actuator.

In general, the sensor and/or the actuator may be supplied with power from a power line, from a local energy storage, such as a battery or a capacitor, and/or from an energy harvesting device, such as a solar panel.

According to an embodiment of the invention, the cable conduit further comprises an energy harvesting device for supplying the sensor and/or the actuator with electrical energy. Electrical energy may be harvested from environmental light, environmental electromagnetic fields, thermal differences, movement and/or vibrations, for example.

The power provided by the energy harvesting device may be discontinuous (for example due to day/night cycles). The sensor and/or the actuator may be adapted for storing superfluous power provided by the energy harvesting device in an energy buffer (such as a secondary battery and/or a super capacitor) local to the sensor. When the energy harvesting device does not provide enough power, the stored energy may be used to supply the sensor and/or the actuator. Alternatively, a primary local battery may be used to power the sensor and/or actuator in case of absence of harvested energy. In this case, the energy harvesting device may be seen as prolonging the lifetime of that battery.

According to an embodiment of the invention, the sensor comprises an RFID (radio-frequency identification) tag for supplying the sensor with electrical energy and/or for sending measurement values. For example, a passive RFID tag with sensing capabilities may be used as sensor. Such a sensor may not need an active energy supply and/or may be designed very compact.

According to an embodiment of the invention, the sensor and/or the actuator is supplied with electrical energy from a wire accommodated in the tube. A wired power supply may be provided, for example as AC or DC power, by two wires that may be embedded in the tube.

The wires may be accommodated in the material of the tube. The sensor and/or actuator then may be connected to the wires via an adapted mechanical device. In case of AC power, the relative electrical polarity of the wires may be not important. In case of DC power, care may have to be taken in order to provide the correct polarity to the sensor and/or actuator. This may be performed through different means, for example by a mechanical connection of the wires, which ensure correct wire connection and/or by a sensor and/or actuator, which is adapted to operate with both polarities.

It also may be that a power supply of the sensor and/or the actuator also may be provided by wires and/or lines provided outside of the tube.

According to an embodiment of the invention, the sensor and/or actuator is supplied from the cable with electrical energy. As a further alternative, a power supply may be provided by a cable, which is a power transmission cable. For example, the cable may be tapped and/or a power supply device, which may supply more than one sensor and/or actuator may be connected to the cable.

There are several possibilities, how the actuator is attached to the cable conduit. In general, it may be attached to the tube directly and/or to further components of the cable conduit, such as fittings for interconnecting tubes and/or T-connections used for branching the tube.

According to an embodiment of the invention, the cable conduit further comprises a fitting attached to an end of the tube, the fitting being adapted to be connected to a further fitting, wherein the actuator is mounted to the fitting. For example, a special fitting may be provided with an integrated actuator, such as a ventilator.

According to an embodiment of the invention, the cable conduit further comprises a T-connection interconnected into the tube, wherein the cable is guided through the T-connection. The actuator may be mounted to the T-connection.

For example, a further device and/or housing may be attached to the tube via the T-connection. This further device and/or housing, may accommodate the actuator and/or the sensor. Via the T-connection, the actuator and/or the sensor may have access to the interior space of the tube.

According to an embodiment of the invention, the actuator is directly mounted to the tube. A further device and/or housing may be attached to the tube, which may accommodate the actuator and/or the sensor. The further device may cover an opening the tube, through which the actuator and/or the sensor may have access to the interior space of the tube.

According to an embodiment of the invention, the sensor comprises a wireless sender for sending measurement data and/or measurement values to an outside of the tube. The sensor may be positioned inside the tube, i.e. in the interior space or in a cavity connected to the interior space. A wireless sender, for example adapted for radio transmission, may send the measurement data collected by the sensor to an outside of the tube. In such a way, it may be not necessary to provide data lines, which run through the material of the tube.

According to an embodiment of the invention, the sensor is positioned inside the interior space of the tube. The sensor may be positioned inside the cable conduit, such that it is in direct contact with the atmosphere inside the cable conduit.

For example, a sensor or sensor strip may be pre-mounted (for example during conduit fabrication) to the cable conduit. A sensor strip may contain several electrical wires (such as 2-3) that are running from one end to the cable conduit to the other. At punctual locations on the sensor strip sensing elements may be placed in such a way that each element electrically connects to each wire of the strip. Each sensing element may affect electrical characteristics of the sensing strip. For example, passive sensing elements may change the resistivity between two wires according to the punctually measured humidity. The overall impedance between the two wires may give the overall humidity. Alternatively, active sensing elements may be installed and the wires may be used to interrogate the sensors.

According to an embodiment of the invention, the sensor is positioned in a cavity in fluid exchange with the interior space of the tube. Such as cavity may be provided by further components connected to the tube, such as a fitting, a mounted device, a T-connection, etc.

According to an embodiment of the invention, the cable conduit further comprises a sensor device attached to the tube, which sensor device provides a cavity outside of the tube. The sensor may be positioned inside the cavity. The tube may have an opening for interconnecting the interior space with the cavity in the sensor device.

The sensor device may be attached from the outside on the cable conduit. The sensor may be placed in a possibly air-tight sensor device that is attached outside to the cable conduit. In a contact area of the sensor device and the tube, an opening may be present, connecting the cavity of the sensor device and the interior space of the tube.

The sensor device may be designed to be used as retro-fit, meaning that it may be installed after the one or more cables are put through the cable conduit (e.g. after final installation of the cable conduit). This may allow for strategic placements that depends on the actual deployment of the cable conduit and not on a priori information.

According to an embodiment of the invention, the sensor device surrounds the tube. For example, the sensor device may have a housing in the form of a ring, which may be attached to surround the tube.

According to an embodiment of the invention, the sensor device comprises at least two parts to be mounted to the tube in a direction orthogonal to an extension direction of the tube. A ring-shaped housing may be mounted to the tube by connecting its parts over the tube.

According to an embodiment of the invention, the sensor device is flexible to be mounted to the tube in a direction orthogonal to an extension direction of the tube. For example, the sensor device may be based on an elastic band, in which a sensor may be provided on a side of the band that is mounted on the tube.

The sensor device may be mounted to the tube by firstly puncturing the tube, for example with an appropriate tool that may create an opening of a correct size without damaging the one or more cables already installed in the conduit. Secondly, the housing of the sensor device may be mounted to the tube above the opening. For example an elastic band may be wrapped around the tube with the opening aligned with the sensor provided in the band.

According to an embodiment of the invention, the sensor device provides an electrical interconnection for electrically interconnecting the sensor with an outside of the tube. When the sensor has to be connected from an outside of the cable conduit, electrical interconnections have to be provided, which reach into the interior of the cable conduit. These interconnections may have to be isolated and sealed, which may be achieved with the sensor device.

According to an embodiment of the invention, the cable conduit further comprises a fitting attached to an end of the tube, the fitting being adapted to be connected to a further fitting. The cable conduit may be made of two or more tubes, which are interconnected with fittings that may be plugged on an end of the respective tube. Complementary fittings may be provided, which may be plugged and/or screwed into each other.

According to an embodiment of the invention, the sensor is positioned inside the fitting. The sensor may be integrated into a fitting and/or may be placed to an interior space of the fitting. In such a way, a sensor may be provided in the cable conduit by mounting a fitting to the tube.

According to an embodiment of the invention, the cable conduit further comprises a sealing ring for sealing the interconnection between the fitting and the further fitting, wherein the sealing ring comprises an electrical interconnection for electrically interconnecting the sensor with an outside of the tube.

The electrical interconnection of the sensor may be guided through a sealing ring between two fittings. The sensor may be placed inside the cable conduit within a sealing ring between the two fittings. An electrical interconnection through the sealing ring may be provided to the outside of the cable conduit, where further electronic components may be attached, such as power harvesting devices, batteries, data storage devices and/or data transmission devices.

With such a setup, a sensor may be retrofitted to a cable conduit with only minor adaption of an existing designs (such as a gap in the fitting through which the electrical interconnection is guided). The sensor also may be retrofitted, when the fitting is made of two separable parts and/or is made openable.

According to an embodiment of the invention, the fitting provides a cavity, in which the sensor is positioned. A cavity for sensor placement may be integrated into the fitting. The sensor and optionally other electronic parts may be placed inside one or more cavities that are provided on an inside of the fitting.

According to an embodiment of the invention, the cable conduit further comprises a T-connection interconnected into the tube, wherein the cable is guided through the T-connection. A T-connection may be a component that is adapted for interconnecting three tubes and/or for interconnecting two tubes with each other hand with a further device having a cavity.

According to an embodiment of the invention, the cable conduit further comprises a sensor device connected to the T-connection and providing a cavity for the sensor in fluid exchange with the interior space of the tube. A T-connection may be attached to the cable conduit leading to a sensor device, in which the sensor and optionally further electrical components may be located. This may provide a cavity with a larger volume available for electronic devices without interfering with the overall cable conduit.

According to an embodiment of the invention, the T-connection comprises two parts, which are connected to the tube, such that the cable is accommodated between them. The T-connection may be mountable to the tube in a direction orthogonal to an extension direction of the tube. When the T-connection can be split into several parts, the T-connection may be retrofitted without the need for disconnecting the cable.

According to an embodiment of the invention, the sensor device is connected via a tube with the T-connection. In such a way, the sensor device may be positioned more remote to the tube.

According to an embodiment of the invention, the cable conduit further comprises an energy harvesting device mounted to an outside of the tube for supplying the sensor with electrical energy, wherein the energy harvesting device is connected to the sensor via an electrical interconnection. For example, the electrical interconnection may be provided by a sealing ring between two fittings or by a sensor device mounted to the tube, which accommodates the sensor.

According to an embodiment of the invention, the sensor comprises an RFID (radio-frequency identification) tag for supplying the sensor with electrical energy and/or for sending measurement values. In this case, an RF reader (or a mobile reader, for example carried around by a service personal) may be used in order to remotely power the sensor and/or to read data from the sensor.

A further aspect of the invention relates to a method for adapting an environmental condition in a cable conduit. The cable conduit may be designed as described in the above and in the below. It has to be understood that features of the method as described in the above and in the following may be features of the cable conduit as described in the above and in the following, and vice versa.

According to an embodiment of the invention, the method comprises: sensing an environmental condition in the interior space with the sensor; sending measurement values of the environmental condition to a control device; evaluating the measurement values with the control device and determining, whether the environmental condition has to be changed; generating and sending control commands to the actuator with the control device; and changing the environment condition with the actuator based on the control commands.

Having the sensor information along a path of the cable conduit, an algorithm may be used to control actuators in order to prevent any undesired environmental condition.

Such an undesired environmental condition may be condensation, which depends on the temperature and/or humidity inside and outside of the cable conduit. Condensation may be reduced by controlled ventilation (such as a change of the direction of airflow), partial heating/cooling of tube segments, active drying and/or opening (optionally through a semipermeable membrane).

The control device may be integrated in a network system, which is provided in the facility into which the cable conduit is integrated. The control device also may be implemented inside the cable conduit, for example in the fittings and/or in a sensor device as described above and below.

According to an embodiment of the invention, the cable conduit comprises a plurality of sensors and the control device receives measurement values from the plurality of sensors, wherein the measurement values are evaluated to determine a location of a defect of the cable conduit. With the measurement data of a plurality of sensors at different locations, failures and abnormal conditions, such as condensation phenomena may be detected and/or predicted.

In combination with an active control of the actuators, a failure detection response speed may be increased, detection sensitivity of the failure may be increased and/or the failure may be better localized.

A local or cloud algorithm may be used to analyze the measurement data provided by the sensors and may provide a warning in case of failure, such as water intrusion in the cable conduit, or abnormal behavior, such as a possible danger of condensation.

In the case of condensation, the algorithm may be based on a thermal model of the cable conduit that takes as inputs discretely distributed temperature and humidity inside the cable conduit, environmental conditions (such as temperature and humidity external to the conduit). The algorithm may be further able to predict potential condensation conditions by running e.g. Monte Carlo simulation based on past environmental conditions.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
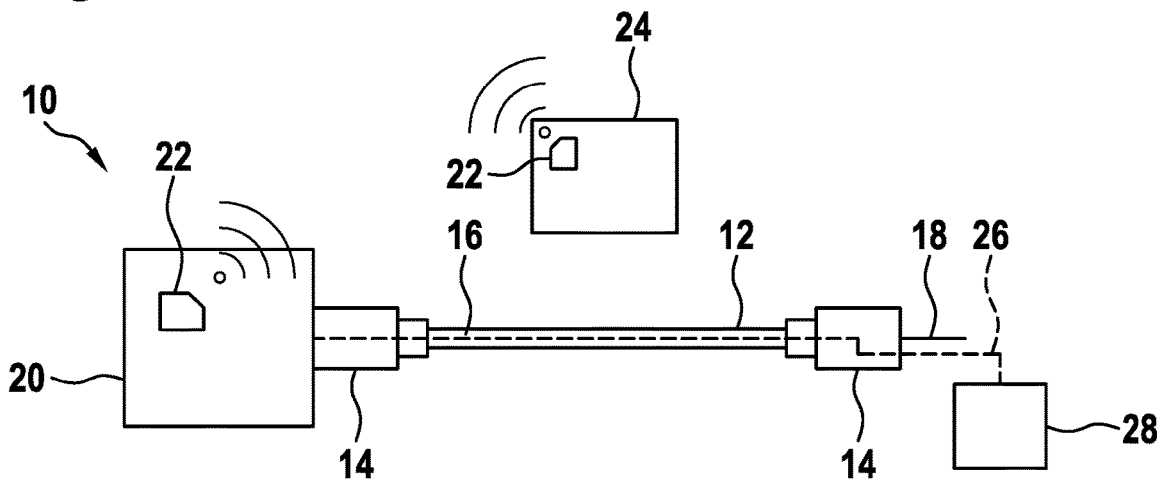
FIG. 1 schematically shows a cable conduit according to an embodiment of the invention.

FIG. 1 shows a cable conduit 10, which comprises a tube 12 and two fittings 14, which are provided at ends of the tube 12. Several tubes 12 may be interconnected with each other via fittings 14 to form a longer cable conduit 10. The fittings 14 also may be used for connecting the cable conduit 10 to an electrical cabinet.

The tube 12 and the fittings 14 have an interior space 16 through which a cable 18 is guided. It has to be understood, that a plurality of cables 18, such as power lines, electric data transmission lines, fibre optics lines, etc. may be accommodated in the interior space 16.

One fitting 14 is provided with a sensor 20, which is adapted for sensing an environmental condition in the interior space 16 of the cable 18. For example, the sensor 20 may be a temperature sensor or a humidity sensor.

As shown in FIG. 1, the sensor 20 may comprise a wireless sender/receiver 22 for data transmission to a control device 24, which also may have such a wireless sender/receiver 22. Measurement values from the sensor 20 may be sent to the control device 24, which may evaluate the measurement values and may determine the environmental condition in the cable conduit 10, such as temperature, humidity, etc.

As shown in the FIG. 1, the sensor 20 may be powered by a power line and/or wire 26, which connects the sensor 20 with a power source 28, such as a battery or generator. The line 26 also may be guided at least partially through the cable conduit 10, in particular through the tube 12 and/or a fitting 14.

It may be that the power source 28 is connected to the cable 18 and is adapted for converting an electrical current in the cable 18 into a current directly suppliable to the sensor 20.

Figure 2:
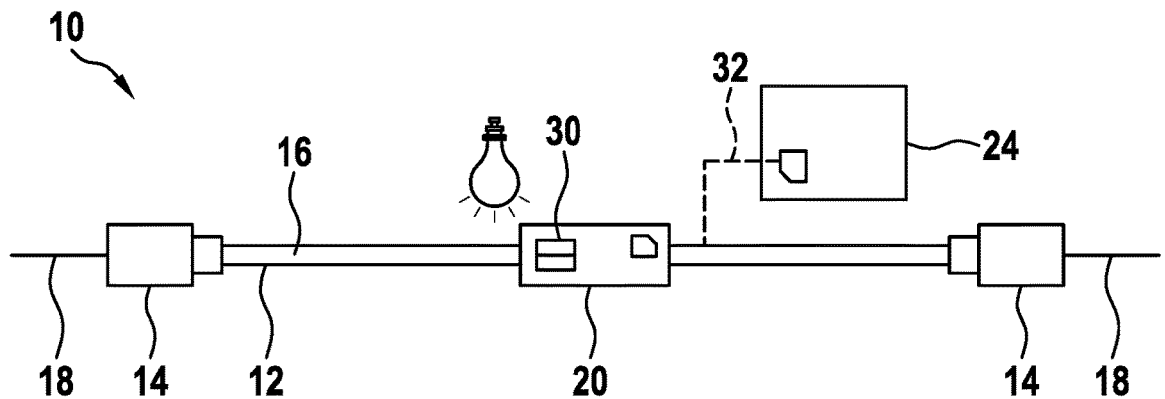
FIG. 2 schematically shows a cable conduit according to an embodiment of the invention.

FIG. 2 shows that the sensor 20 may be directly attached to the tube 12. In FIG. 2, the sensor 20 comprises an energy harvesting device 30, such as a solar panel, for supplying the sensor 20 with electrical energy.

In FIG. 2, the data transmission between the sensor 20 and the control device 24 may be performed wired via a data transmission wire and/or line 32. The line 32 may be at least partially guided through the cable conduit 10, in particular through the tube 12 and/or a fitting 14.

Figure 3:
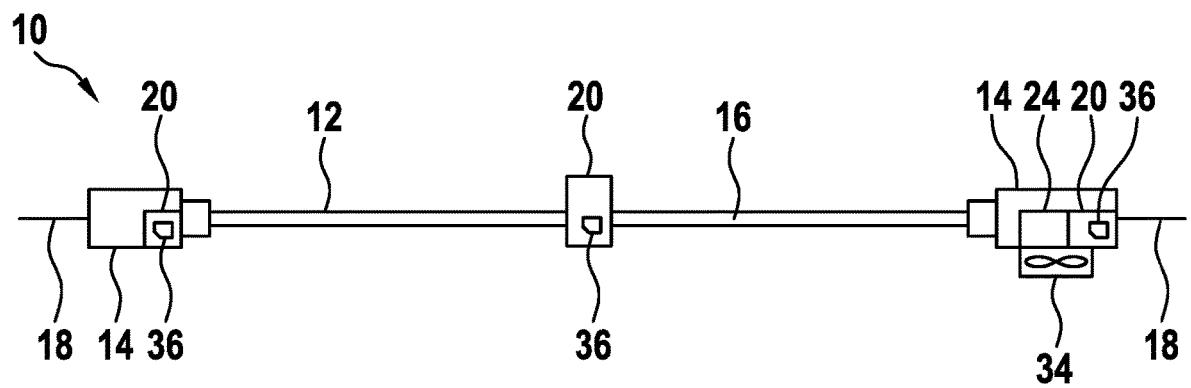
FIG. 3 schematically shows a cable conduit according to an embodiment of the invention.

FIG. 3 shows a cable conduit 10 with three sensors 20. Furthermore, the cable conduit 10 of FIG. 3 comprises an actuator 34 for changing the environmental condition in the interior space 16. For example, the actuator 34 is a ventilator, a heater, a cooler, an automatically openable and closable flap, etc. In general, a cable conduit 10 may comprise a plurality of sensors 20 at different positions and/or a plurality of actuators 34 at different locations.

In FIG. 3, two of the sensors 20 are integrated into the fittings 14. The actuator 34 is mounted to one of the fittings 14. Furthermore, a third sensor 20 is directly attached to the tube 12.

In FIG. 3, each of the sensors 20 comprises a power line transmission device 36 for sending measurement values via the cable 18 and/or for data transmission to a control device 24.

Also the actuator 34 may comprise such a power line transmission device 36 for receiving control commands via the cable 18 and/or for data transmission to a control device 24. Alternatively, the actuator 34 may comprise a wireless sender/receiver 22 for data transmission to a control device 24.

In FIG. 3, the control device 24 is also integrated in the fitting 14, in which the sensor 20 is integrated and to which the actuator 34 is mounted. The power line transmission device 36 may be integrated into the control device 24. The control device 24 may perform data communication with the sensor 20 and the actuator 34 via a line. The sensors 20 remote from the fitting may transmit their data via the cable 18, via an additional data transmission line and/or wireless.

The energy supply of the sensors 20 and/or the actuator 34 may be performed as described with respect to FIGS. 1 and 2. For example, the actuator 34 may be supplied by an energy harvesting device, a battery, a power source, etc.

Figure 4:
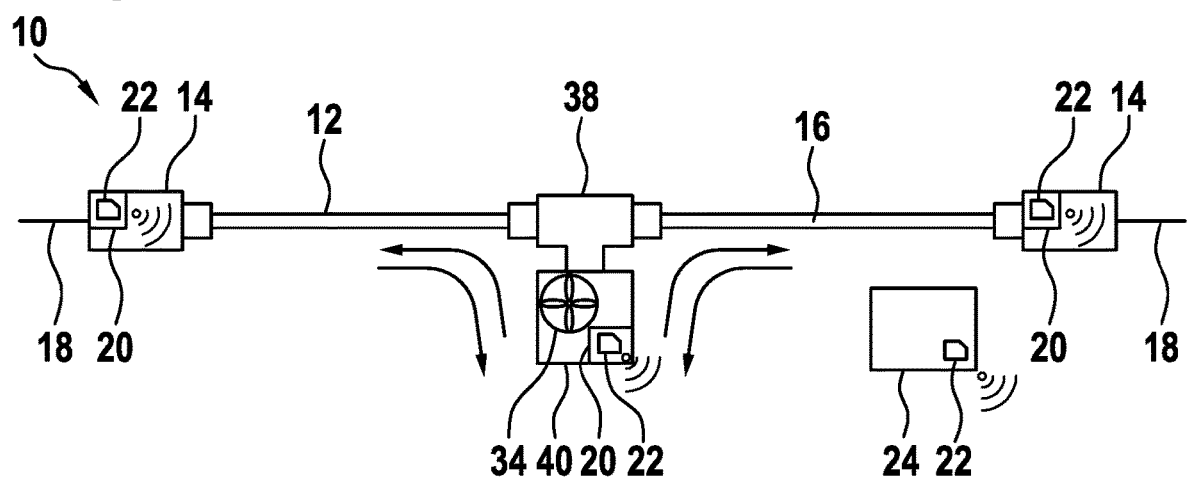
FIG. 4 schematically shows a cable conduit according to an embodiment of the invention.

FIG. 4 shows a T-connection 38 interconnected into the tube 12. The cable 18 is also guided through the T-connection 38. A sensor and/or actuator device 40, such as a sensor and/or actuator box, is mounted to the T-connection 38. The device 40 may accommodate a sensor 20 and/or an actuator 34.

Figure 5:
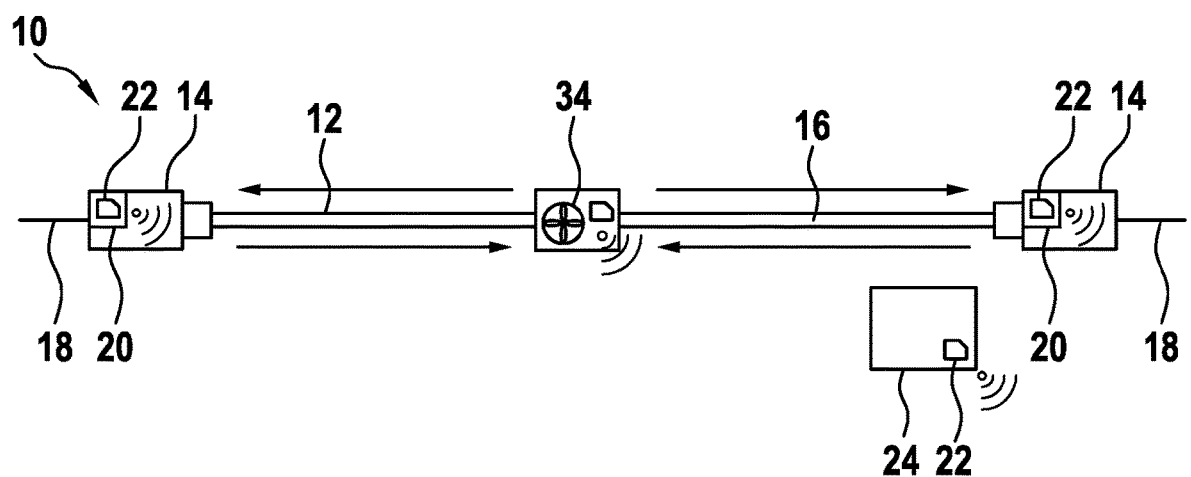
FIG. 5 schematically shows a cable conduit according to an embodiment of the invention.

FIG. 5 shows that the actuator 34 may be directly mounted to the tube 12. All the sensors 20 and the actuator 34 may communicate via wireless sender/receivers 22 with a control device 24, which may determine an environment condition in the cable conduit 10 from the measurement data of the sensors 20 and may change the environment condition via the actuator 34.

It has to be noted that the types of power supply, data transmission and/or location of sensors 20 and actuators 34 within the cable conduit 10, as shown with respect to FIGS. 1 to 5 may be exchanged and/or mixed with each other. For example, it may be possible that some of the sensors 20 and/or actuators 34 are supplied via a line 26, while other sensors 20 and/or actuators are supplied by energy harvesting devices 30. Furthermore, it may be that some of the sensors 20 and/or actuators 34 perform wired data transmission, while other sensors 20 and/or actuators 34 perform wireless data transmission, etc.

Figure 6:
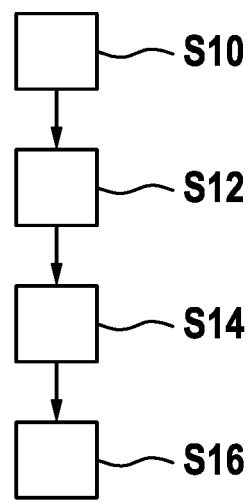
FIG. 6 shows a method for adapting an environmental condition in a cable conduit according to an embodiment of the invention.

FIG. 6 shows a method for adapting an environmental condition in a cable conduit 10, for example such as shown in FIGS. 1 to 5.

In step S10, the sensors 20 sense an environmental condition, such as temperature, humidity, etc., in the interior space 16 and send the measurement data to the control device 24. The control device 24 may be a part of a control and/or network system of a facility, in which the cable conduit is employed. The control device 24 may be a server connected via Internet and/or optionally via a gateway with the sensors 20 and/or actuators 34.

In step S12, the control device 24 determines the environmental condition in the cable conduit 10 from the measurement data.

It may be that environmental conditions are determined for different sections of the cable conduit 12.

It also may be that the measurement data is evaluated to determine a location of a defect of the cable conduit 10. A section of the cable conduit 10, where the environmental condition differs more than a threshold from a desired environmental condition, may be determined as a defect section. For example, a section, where the temperature is much too high or the humidity is much too high may have a hole, where hot air and/or water may get in the interior space 16.

In step S14, the control device 24 determines, whether the environmental condition has to be changed. This may be the case, when the environmental condition, such as temperature and/or humidity, is higher and/or lower than a threshold.

The control device 24 may decide, whether in specific sections the environmental condition has to be changed and may determine actuators 34, which may be used, and may send control commands to these actuators 34.

In step S16, the one or more actuators 34 receiving the control commands change the environment condition. For example, a cooler may cool the air in the cable conduit 10 and/or a ventilator may blow air of lower humidity and/or lower temperature into the cable conduit 10.

FIGS. 4 and 5 show that the flow of air in the cable conduit 10 may have different directions. The flow direction may be chosen according to a desired change of the environmental condition. For example, cooler air from one end of the cable conduit 10 may be blown to an end with hotter air, and vice versa.

The following FIGS. 7 to 13 show embodiments of parts of a cable conduit 10 and how sensors 20 and/or actuators 34 may be integrated into a cable conduit 10.

Figure 7:
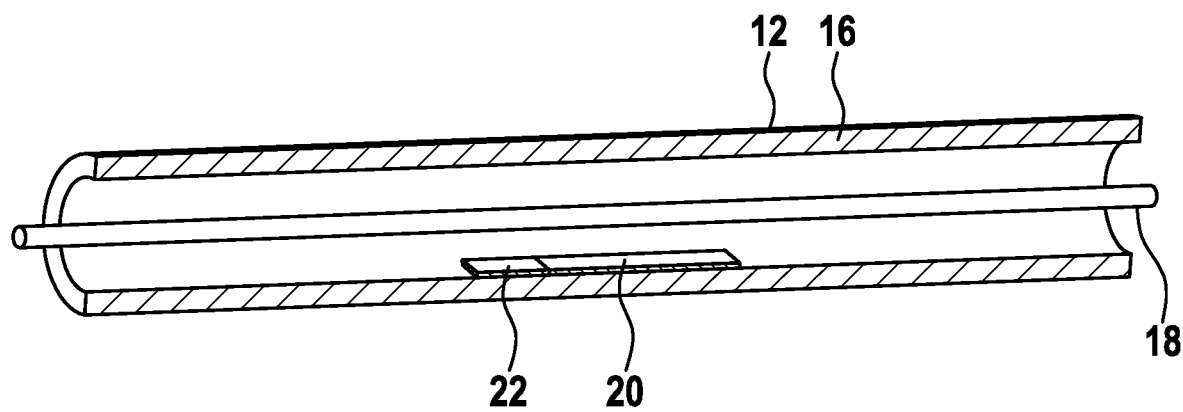
FIG. 7 shows a cross-sectional view of a part of a cable conduit according to an embodiment of the invention.

FIG. 7 shows a cable conduit 10 with a tube 12 that is one-piece and/or that has a round cross-section. Other types of tubes 12, i.e. tubes made of two or more parts and/or other shape also may be used. Furthermore, a cable 18 is shown schematically, which is accommodated in the interior space 16 of the tube 12. In the following figures, the cable 18 is omitted.

A sensor 20 for sensing an environmental condition in the interior space 16 is provided in the tube 12. The sensor 20 may be a sensor strip, which may be integrated in the material of the tube 12 or may be laid into the tube 12.

The sensor 20 comprises a wireless sender/receiver 22 for sending measurement data to an outside of the tube 12. The tube 12 may be made of plastics and/or may be permeable for radio signals.

Figure 8:
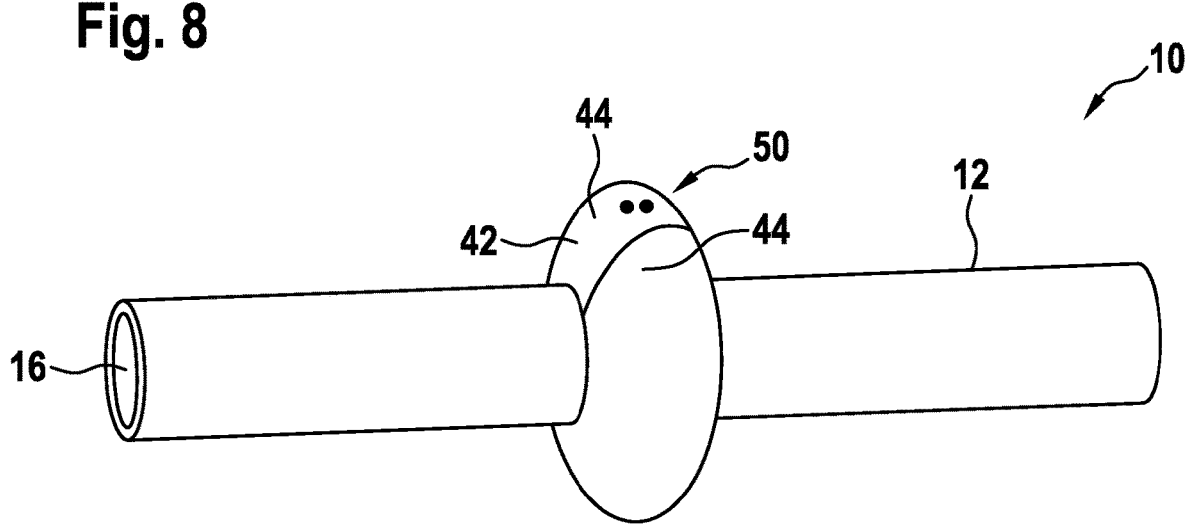
FIG. 8 shows a perspective view of a part of a cable conduit according to an embodiment of the invention.
Figure 9:
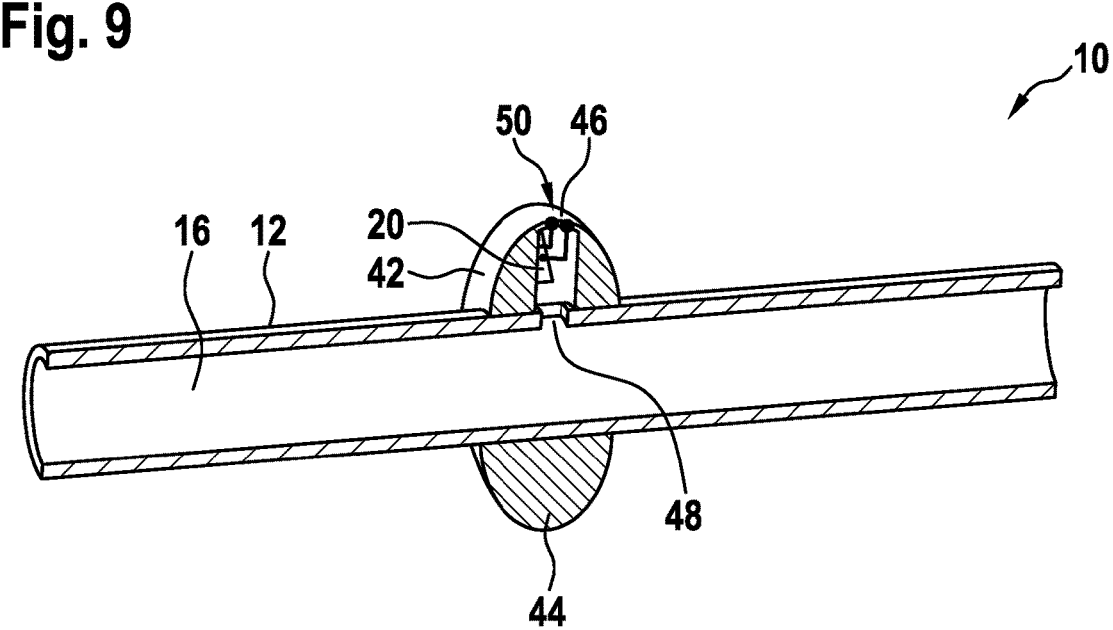
FIG. 9 shows a cross-sectional view of the part of the cable conduit of FIG. 8.

FIGS. 8 and 9 show a further embodiment with a sensor device 20 that is mounted directly on the tube 12. The sensor device 42 surrounds the tube and/or may comprise at least two parts 44 to be mounted to the tube 12 in a direction orthogonal to an extension direction of the tube 12. In other words, the sensor device 42 may be mounted to the tube 12 after the cable 18 has been put into the tube 12 and/or fittings 14 have been attached to the tube 12.

It also may be that the sensor device 42 is flexible. For example, the sensor device 42 may be made of rubber and/or may have a slit to be mounted over the tube 12.

The sensor device 42 has a cavity 46, which is arranged outside of the interior space 16 of the tube 12 and which is in fluid exchange with the interior space 16 of the tube 12. The tube 12 has an opening 48 for interconnecting the interior space 16 with the cavity 46 in the sensor device 42. Such an opening 48 may be made after the cable 18 has been laid into the tube 12 for retrofitting the sensor device 42 on the tube 12.

A sensor 20 is positioned inside the cavity 46. The sensor device 42 furthermore may provide an electrical interconnection 50 for electrically interconnecting the sensor 20 with an outside of the tube 12. The electrical interconnection 50 may comprise some or more conductors, which run from the cavity 46 to an outside of the sensor device 42. For example, the electrical interconnection 50 may be cast into a housing of the sensor device 42.

Figure 10:
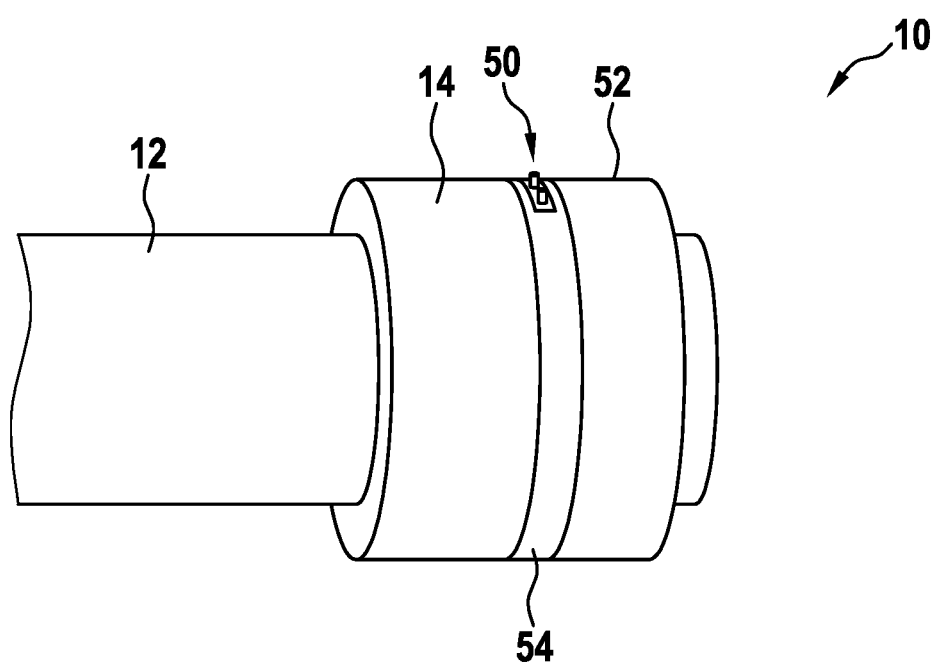
FIG. 10 shows a perspective view of a part of a cable conduit according to an embodiment of the invention.
Figure 11:
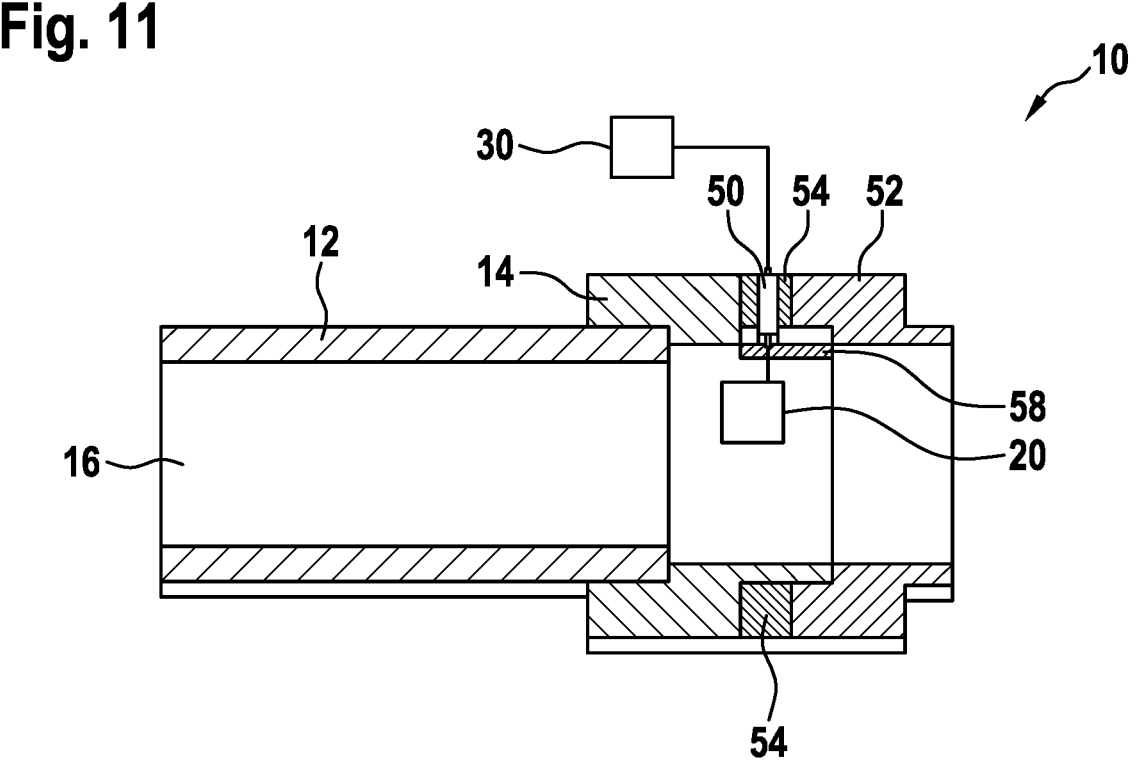
FIG. 11 shows a cross-sectional view of the part of the cable conduit of FIG. 10.

FIGS. 10 and 11 show a further embodiment with a sensor 20 that is integrated into a fitting 14 or at least arranged inside the fitting 14. The fitting 14 is attached to an end of the tube 12 and is connected to a further fitting 52. The fittings 14, 52 may be plugged and/or screwed into each other and/or a sealing ring 54 for sealing the interconnection between the fittings 14, 52 may be provided between them. It also may be that the fitting 14 has a threading 58 to which the further fitting 52 is screwed.

The sensor 20 is positioned inside the fitting 14 and connected via the sealing ring 54 with electrical components, such as an energy harvesting device 30, outside of the tube 12. The sealing ring 54 comprises an electrical interconnection 50, which may be an electrical line or wires provided in the material of the sealing ring 54.

The threading 58 may have an opening or gap, through which the electrical interconnection 50 is guided.

It also may be that the sensor 20 is positioned inside the interior space 16 of the tube 12 and connected via the electrical interconnection 50 with components, such as an energy harvesting device 30 at an outside of the tube 12.

Figure 12:
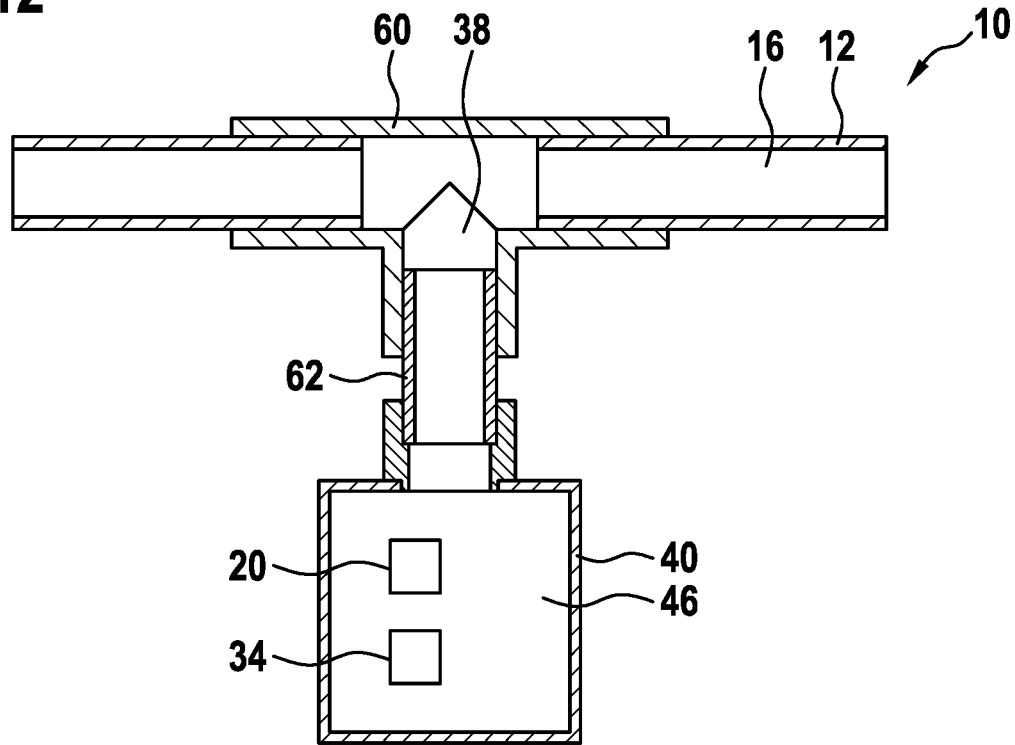
FIG. 12 shows a cross-sectional view of a part of a cable conduit according to an embodiment of the invention.

FIG. 12 shows a cable conduit 10, where a sensor and/or actuator device 40 is connected via a T-connection 38. The T-connection 38 is interconnected into the tube 12 and the cable 18 is guided through the T-connection 38. The T-connection 38 may comprises two parts 60, which are connected to the tube 12, such that the cable 18 is accommodated between them and/or that the T-connection 38 can be retrofitted to the tube 12 without removing the cable 18.

The sensor and/or actuator device 40 is connected via a tube 62 to the T-connection 38 and provides a cavity 46 in fluid exchange with the interior space 16 of the tube 12. In the cavity a sensor 20 and/or an actuator 34 may be provided.

Figure 13:
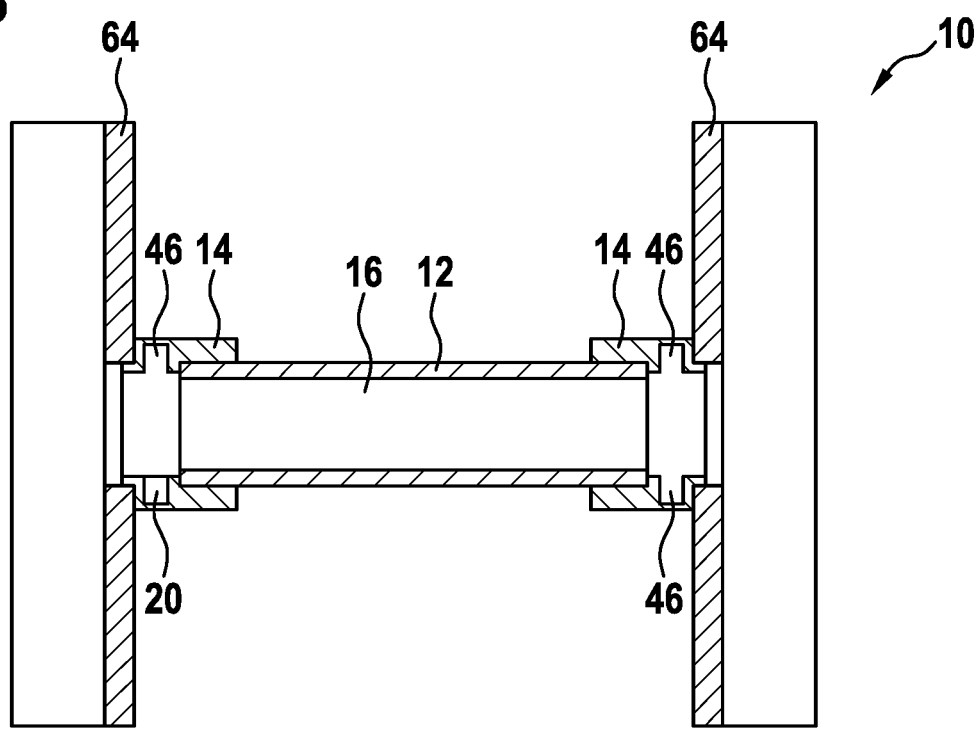
FIG. 13 shows a cross-sectional view of a part of a cable conduit according to an embodiment of the invention.

FIG. 13 shows a cable conduit 10, which comprises a tube 12 that is connected via fittings 14 to housings 64 of further devices, such as electrical cabinets. Each of the fittings 14 provides a cavity 46, in which a sensor 20 may be positioned. For retrofitting the cable conduit 10 with a sensor 20, a fitting without a sensor 20 may be replaced with a fitting 14, in which a sensor is integrated.

It has to be noted that the types of power supply and data transmission as described with respect to FIGS. 1 to 5 may be applied to the embodiments shown in FIGS. 6 to 13.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 cable conduit
12 tube
14 fitting
16 interior space
18 cable
20 sensor
22 wireless sender/receiver
24 control device 26 power line
28 power source
30 energy harvesting device
32 data transmission line
34 actuator
36 power line transmission device
38 T-connection
40 sensor and/or actuator device
42 sensor device
44 part of sensor device
46 cavity
48 opening
50 electrical interconnection
52 further fitting
54 sealing ring
58 threading
60 part of T-connection
62 tube
64 housing

The invention claimed is:

1. A cable conduit, comprising: at least one cable; a tube, which accommodates the cable in an interior space; a sensor for sensing an environmental condition in the interior space; wherein the sensor comprises a wireless sender for sending measurement data to an outside of the tube, wherein the sensor is positioned in a cavity in fluid exchange with the interior space of the tube; wherein the cavity is provided by a further component connected to the tube, wherein the cable conduit further comprises a sensor device attached to the tube, which the sensor device provides the cavity outside of the tube; and wherein the tube has an opening for interconnecting the interior space with the cavity in the sensor device.

2. The cable conduit of claim 1,
wherein the sensor device surrounds the tube.

3. The cable conduit of claim 1,
wherein the sensor device comprises at least two parts to be mounted to the tube in a direction orthogonal to an extension direction of the tube; and/or
wherein the sensor device is flexible to be mounted to the tube in a direction orthogonal to an extension direction of the tube.

4. The cable conduit of claim 1,
wherein the sensor device provides an electrical interconnection for electrically interconnecting the sensor with an outside of the tube.

5. The cable conduit of claim 1, further comprising:
a fitting attached to an end of the tube, the fitting being adapted to be connected to a further fitting;
wherein a further sensor is positioned inside the fitting.

6. The cable conduit of claim 5, further comprising:
a sealing ring for sealing an interconnection between the fitting and the further fitting;
wherein the sealing ring comprises an electrical interconnection for electrically interconnecting the further sensor with an outside of the tube.

7. The cable conduit of claim 5,
wherein the fitting provides a cavity, in which the further sensor is positioned.

8. The cable conduit of claim 1, further comprising:
a T-connection interconnected into the tube, wherein the cable is guided through the T-connection;
wherein the sensor device is connected to the T-connection and provides the cavity for the sensor in fluid exchange with the interior space of the tube.

9. The cable conduit of claim 8,
wherein the T-connection comprises two parts, which are connected to the tube, such that the cable is accommodated between them.

10. The cable conduit of claim 8,
wherein the sensor device is connected via an additional tube with the T-connection.

11. The cable conduit of claim 1, further comprising:
an energy harvesting device mounted to an outside of the tube for supplying the sensor with electrical energy;
wherein the energy harvesting device is connected to the sensor via an electrical interconnection.

12. The cable conduit of claim 1,
wherein the sensor comprises an RFID tag for supplying the sensor with electrical energy and/or for sending measurement values.

* * * * *